United States Patent
Morris

(10) Patent No.: US 9,556,381 B2
(45) Date of Patent: Jan. 31, 2017

(54) FIBER MULCH

(71) Applicant: Phoenix Paper Products, Inc., Lostant, IL (US)

(72) Inventor: Samuel J. Morris, Dana, IL (US)

(73) Assignee: Phoenix Paper Products, Inc., Lostant, IL (US)

(*) Notice: Subject to any disclaimer, the term of this patent is extended or adjusted under 35 U.S.C. 154(b) by 192 days.

(21) Appl. No.: 14/501,644

(22) Filed: Sep. 30, 2014

(65) Prior Publication Data

US 2015/0090933 A1    Apr. 2, 2015

Related U.S. Application Data

(60) Provisional application No. 61/884,470, filed on Sep. 30, 2013.

(51) Int. Cl.
*A01G 7/00* (2006.01)
*C09K 17/52* (2006.01)
*A01G 13/00* (2006.01)

(52) U.S. Cl.
CPC ........... *C09K 17/52* (2013.01); *A01G 13/0262* (2013.01)

(58) Field of Classification Search
CPC .............................. A01G 13/0262; C09K 17/52
See application file for complete search history.

(56) References Cited

U.S. PATENT DOCUMENTS

| | | |
|---|---|---|
| 5,741,832 A | 4/1998 | Spittle |
| 5,779,782 A | 7/1998 | Spittle |
| 5,916,027 A | 6/1999 | Spittle |
| 5,942,029 A | 8/1999 | Spittle |
| 6,076,299 A | 6/2000 | Spittle et al. |
| 6,158,167 A | 12/2000 | Spittle |
| 6,293,045 B1* | 9/2001 | Morgan ................. C09K 17/52 47/1.01 F |
| 6,349,499 B1 | 2/2002 | Spittle |
| 6,360,478 B1 | 3/2002 | Spittle |
| 6,523,299 B2 | 2/2003 | Morris |
| 6,729,807 B1 | 5/2004 | Spittle |
| 6,829,860 B1* | 12/2004 | Lee ......................... C09K 17/52 47/9 |
| 2002/0129545 A1* | 9/2002 | Morris ................... C09K 17/52 47/9 |
| 2006/0070294 A1* | 4/2006 | Spittle ................ A01G 13/0268 47/9 |
| 2006/0247130 A1* | 11/2006 | Van Der Krieken .. A01N 41/04 504/291 |
| 2007/0283620 A1* | 12/2007 | Karpik ............... A01G 13/0262 47/9 |
| 2015/0068115 A1* | 3/2015 | Loucks ................. A01C 21/00 47/9 |

* cited by examiner

*Primary Examiner* — Kristen C Hayes
(74) *Attorney, Agent, or Firm* — The Watson IP Group, PLC; Jovan N. Jovanovic; Vladan M. Vasiljevic

(57) ABSTRACT

A fiber mulch having a first material and a second material. The first material comprises a cellulose based material, for example, shredded recycled paper fibers, including, but not limited to, newsprint. The second material comprises a shredded wheat straw. It is contemplated that, by weight, the wheat straw comprises between 5% and 20% by weight of the fiber mulch, while other formulations are contemplated. Tackifiers and surfactants may be incorporated. The fiber mulch may be bailed or pelleted.

14 Claims, 1 Drawing Sheet

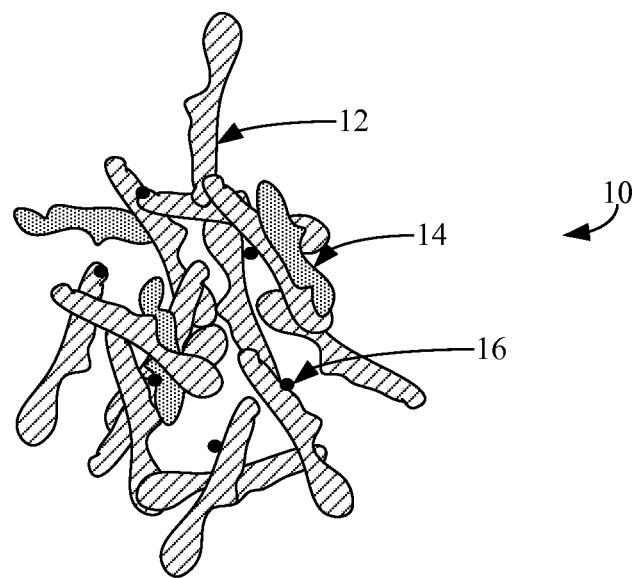

FIBER MULCH

CROSS REFERENCE TO RELATED APPLICATION

This application claims priority from U.S. Prov. Pat. App. Ser. No. 61/884,470 filed Sep. 30, 2013, entitled "Fiber Mulch", the entire specification of which is hereby incorporated by reference in its entirety.

BACKGROUND OF THE DISCLOSURE

1. Field of the Disclosure

The invention relates in general to mulch products, and more particularly, to mulch products that can be used in association with the germination of seeds and the like, which generally comprise a plurality of fibers that are intimately mixed and either bailed or pelleted.

2. Background Art

The use of germination aids for grass seed and the like in the form of fiber mulches is well known in the art. A number of different formulations have been developed and have entered the marketplace. Among others, one such mulch is disclosed in U.S. Pat. No. 6,523,299 issued to Morris, the entire specification of which is hereby incorporated by reference in its entirety. Other mulches are U.S. Pat. Nos. 5,779,782; 5,916,027; 6,076,299; 6,349,499; 6,360,478; 6,729,807; 6,158,167; 5,942,029; and 5,741,832 all issued to Spittle alone or in association with a co-inventor.

Despite these developments, there remain drawbacks. For example, among other drawbacks, it is desirable to improve both the absorption of water as well as the overall amount of water that is retained by a given quantity of mulch. For example, while relatively expensive, a surfactant can be utilized to improve the absorption of water. Unfortunately, it may be difficult to properly intimately mix these materials properly and the cost of the surfactant may have a negative impact on the overall product acceptance.

It would be advantageous to provide a mulch that would have improved absorption and retention properties over that which is provided in the prior art. It would be advantageous to provide a mulch formulation that can provide improved results without the use of surfactants. It would additionally be advantageous to provide a mulch formulation which has the flexibility to be utilized in a number of applications in either a bailed or a pellitized format.

SUMMARY OF THE DISCLOSURE

The disclosure is directed to a fiber mulch having a first material and a second material. The first material comprises a cellulose based material. For example, shredded recycled paper fibers (such as, newsprint) are contemplated for use as the first material. The second material comprises a shredded wheat straw. It is contemplated that, by weight, the wheat straw comprises between 5% and 20% by weight of the fiber mulch (while other formulations are contemplated).

In certain embodiments, a tackifier may be utilized. In addition, a surfactant may be provided.

It will be understood that the fiber mulch may be bailed or pelleted. It has been found that there is generally not a need to break up or grind the pelleted mulch prior to use.

In one aspect of the disclosure, the disclosure is directed to a mulch comprising a first material and a second material. The first material comprises a shredded cellulose based material. The second material comprises a shredded wheat straw material.

The first material and the second material are intimately mixed in a ratio wherein the second material comprises, by weight between 1% and 40% of the mulch.

In some configurations, the second material comprises, by weight, between 5% and 20% of the mulch.

In some configurations, the second material is entirely composed of shredded wheat straw material.

In some configurations, the second material is entirely composed of shredded wheat straw material and shredded corn fiber material.

In some such configurations, the second material is entirely composed of shredded wheat straw material and shredded corn fiber material with the wheat straw material comprising, by weight, between 10% and 30% of the second material.

In some configurations, the mulch is free of a surfactant.

In some configurations, the mulch further comprises a surfactant, by weight comprising between 1% and 5% of the mulch.

In some configurations, the mulch is a baled mulch.

In some configurations, the mulch is capable of being pelletized.

In another aspect of the disclosure, the disclosure is directed to a mulch composed essentially of a first material, and a second material, and at least one of a tackifier, a surfactant and a dye. The first material consists essentially of a shredded cellulose based material. The second material consists essentially of a shredded wheat straw material and a shredded corn fiber material. The first material and the second material are intimately mixed in a ratio wherein the second material comprises, by weight between 1% and 40% of the mulch.

In some configurations, the first material and the second material are intimately mixed in a ratio wherein the second material comprises, by weight between 5% and 20% of the mulch.

In some configurations, the first material and the second material are intimately mixed in a ratio wherein the second material comprises by weight approximately 10% of the mulch.

In some configurations, the surfactant is eliminated.

In some configurations, the wheat straw material and the corn fiber material are mixed in a ratio, by weight, of between 90%:10% and 70%:30% corn fiber material to wheat straw material.

In another aspect of the disclosure, the disclosure is directed to a mulch composed essentially of a first material and a second material. The first material consists essentially of a shredded cellulose based material. The second material consists essentially of a shredded wheat straw material and a shredded corn fiber material. The first material and the second material are intimately mixed in a ratio wherein the second material comprises, by weight between 1% and 40% of the mulch.

In some configurations, the first material and the second material are intimately mixed in a ratio wherein the second material comprises, by weight between 5% and 20% of the mulch.

In some configurations, the first material and the second material are intimately mixed in a ratio wherein the second material comprises by weight approximately 10% of the mulch.

In some configurations, the wheat straw material and the corn fiber material are mixed in a ratio, by weight, of between 90%:10% and 70%:30% corn fiber material to wheat straw material.

BRIEF DESCRIPTION OF THE DRAWINGS

The disclosure will now be described with reference to the drawings wherein:

FIG. 1 of the drawings is a schematic description of the intimately mixed fibers which are utilized in association with the present disclosure.

DETAILED DESCRIPTION OF THE DISCLOSURE

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the fiber mulch 10 of the present disclosure includes a first material 12, second material 14 and additives, such as additive 16. Generally, such a mulch is intimately mixed into a bailed product, or run through a pelletizer and formed into pellets.

In the embodiment contemplated, the first material comprises a shredded cellulose based material, such as a recycled paperboard. For example, shredded newsprint, or paper (including cardboard), may form the first material. Other, cellulose based material are likewise contemplated. While a number of different compositions are contemplated, it is contemplated that a composition of fiber mulch utilizes approximately, substantially 90% by weight of the first material. In other embodiments, the composition of the first material may be between 20% and 95% by weight of the overall mulch.

In the embodiment contemplated, the second material comprises a shredded wheat straw. Such a material is formed from the portions of the wheat plant, generally not including the seeds (although some of the seeds may be incorporated nevertheless). It is contemplated that the fiber mulch utilizes approximately, approximately, substantially 10% by weight of the second material. In other embodiments, the composition of the second material may be between 1% and 40% by weight of the overall mulch, and most preferably between 5% and 20% by weight.

The second material may additionally comprise a combination of shredded corn fibers (corn stalks and corn husks) and wheat straw. Such a combination of material is likewise provided in the same ratios by weight. In many such configurations, the second material may comprise any ratio of wheat straw to corn fibers, with one acceptable ratio being between 70%:30% and 90%:10% corn fibers to wheat straw fibers (both of which are shredded).

It is also contemplated that a dye may be employed so as to provide a desired shade of color. In certain embodiments, such coloring may be a shade of green, whereas, in other embodiments, a dirt, soil or other color may be utilized. Of course, other colors are likewise within the scope of the present disclosure, such as colors that correspond to particular buildings, sports teams and the like.

In still other embodiments, it is contemplated that a surfactant, or a tackifier or other additive may be incorporated. Surprisingly, it has been found that the uptake of water by the mulch is accelerated to an extent that an additional surfactant is generally not required.

It is also understood that in other embodiments, it may nevertheless be advantageous to include a surfactant, or a tackifier or other material. For example, with respect to a tackifier, one may be utilized where short slope stabilization is required. In other embodiments, a polyacrylamide can be combined for purposes of soil stabilization. As for surfactants, both anionic and non-ionic surfactants are contemplated. Among other surfactants, sodium lauryl sulfate is contemplated for use. For example, and not being limited to the same, about 1% by weight of sodium lauryl sulfate may be utilized. It is contemplated that the surfactant may comprise between 1% and 5% by weight of the mulch. It has been found, however, that the surfactant in some embodiments may be entirely eliminated.

It will be understood that the first material, the second material and any additives and dyes may be added together and intimately mixed. Water can be added to provide the necessary moisture content to the intimate mixture. In certain embodiments, the material can be bailed, whereas in other embodiments, the material can be pelletized. Generally, the pelletized product is on the order of 22-30 pounds per cubic foot. It is contemplated that higher ranges such as 30-40 pounds per cubic foot are contemplated on relatively low straw concentrations. Of course, other weights are contemplated, such as, for example, less than 20 pounds, however, it is believed that such a formulated weight would have difficulty relative to flowing. Advantageously, due to the nature of the combination of the first material and the second material, it is not necessary to grind down the pellets.

Among other examples, one example comprises 10% by weight of the second material, which comprises approximately 10% to 30% by weight of wheat straw. Approximately 1% by weight sodium lauryl sulfate is added, with the balance being the first material. It has been found that, as compared to, for example, a mulch product marketed by Phoenix Paper Products, under the mark EZ Mulch, the mulch of the present example provides a 25% increase in water holding capacity and 20-30% more expansion. It has been found that the inclusion of wheat straw can minimize the use of surfactants such as sodium lauryl sulfate, and, likewise eliminate the use altogether in some cases.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A mulch comprising:
   a first material which comprises a shredded cellulose based material;
   a second material which comprises a shredded wheat straw material, wherein the second material is entirely composed of shredded wheat straw material and shredded corn fiber material;
   wherein the first material and the second material are intimately mixed in a ratio wherein the second material comprises, by weight between 1% and 40% of the mulch.

2. The mulch of claim 1 wherein the second material comprises, by weight, between 5% and 20% of the mulch.

3. The mulch of claim 1 wherein the second material is entirely composed of shredded wheat straw material and shredded corn fiber material with the wheat straw material comprising, by weight, between 10% and 30% of the second material.

4. The mulch of claim 1 wherein the mulch is free of a surfactant.

5. The mulch of claim 1 further comprising a surfactant, by weight comprising between 1% and 5% of the mulch.

6. The mulch of claim 1 wherein the mulch is a baled mulch.

7. The mulch of claim 1 wherein the mulch is capable of being pelletized.

8. A mulch composed essentially of:
a first material which consists essentially of a shredded cellulose based material;
a second material which consists essentially of a shredded wheat straw material and a shredded corn fiber material, wherein the wheat straw material and the corn fiber material are mixed in a ratio, by weight, of between 90%:10% and 70%:30% corn fiber material to wheat straw material;
and at least one of a tackifier, a surfactant and a dye;
wherein the first material and the second material are intimately mixed in a ratio wherein the second material comprises, by weight between 1% and 40% of the mulch.

9. The mulch of claim 8 wherein the first material and the second material are intimately mixed in a ratio wherein the second material comprises, by weight between 5% and 20% of the mulch.

10. The mulch of claim 9 wherein the first material and the second material are intimately mixed in a ratio wherein the second material comprises by weight approximately 10% of the mulch.

11. A mulch composed essentially of:
a first material which consists essentially of a shredded cellulose based material;
a second material which consists essentially of a shredded wheat straw material and a shredded corn fiber material;
and at least one of a tackifier, a surfactant and a dye;
wherein the first material and the second material are intimately mixed in a ratio wherein the second material comprises, by weight between 1% and 40% of the mulch, and wherein the mulch is free of a surfactant.

12. A mulch composed essentially of:
a first material which consists essentially of a shredded cellulose based material; and
a second material which consists essentially of a shredded wheat straw material and a shredded corn fiber material, wherein the wheat straw material and the corn fiber material are mixed in a ratio, by weight, of between 90%:10% and 70%:30% corn fiber material to wheat straw material;
wherein the first material and the second material are intimately mixed in a ratio wherein the second material comprises, by weight between 1% and 40% of the mulch.

13. The mulch of claim 12 wherein the first material and the second material are intimately mixed in a ratio wherein the second material comprises, by weight between 5% and 20% of the mulch.

14. The mulch of claim 13 wherein the first material and the second material are intimately mixed in a ratio wherein the second material comprises by weight approximately 10% of the mulch.

\* \* \* \* \*